United States Patent [19]
Harvey

[11] 4,339,193
[45] Jul. 13, 1982

[54] CAMERA DOOR AND BODY CONSTRUCTION

[75] Inventor: Donald M. Harvey, Webster, N.Y.

[73] Assignee: Eastman Kodak Company, Rochester, N.Y.

[21] Appl. No.: 260,866

[22] Filed: May 6, 1981

[51] Int. Cl.³ .............................................. G03B 17/02
[52] U.S. Cl. ................................................. 354/288
[58] Field of Search ............... 354/202, 203, 219, 187, 354/275, 288, 214; 242/71.1

[56] References Cited

U.S. PATENT DOCUMENTS 2,566,267 8/1951 Wallace ......................... 242/71.1 X

FOREIGN PATENT DOCUMENTS

| | | | |
|---|---|---|---|
| 949324 | 9/1956 | Fed. Rep. of Germany | 354/275 |
| 362322 | 4/1906 | France . | |
| 1061678 | 12/1953 | France | 354/288 |
| 722587 | 1/1955 | United Kingdom | 354/214 |
| 1110057 | 4/1968 | United Kingdom . | |

*Primary Examiner*—Donald A. Griffin
*Attorney, Agent, or Firm*—R. A. Fields

[57] ABSTRACT

A camera door and body are configured to allow only limited access to the camera interior for film loading, in order to shield interior mechanisms from foreign particles and tampering, and to allow greater or unlimited access to the camera interior should it become necessary, for example, to clear a film jam in the camera or to repair or clean an interior mechanism.

9 Claims, 4 Drawing Figures

CAMERA DOOR AND BODY CONSTRUCTION

BACKGROUND OF THE INVENTION

1. Field of the Invention

The present invention relates generally to photographic cameras, and more particularly to a camera door and body construction which substantially shields the camera interior during film loading and unloading to protect interior mechanisms from foreign particles and tampering.

2. Description of the Prior Art

Most still picture cameras that are available today fall into two general categories in connection with film loading. That is, a particular camera usually is either a "bottom-loaded" type or a "back-loaded" type. In the bottom-loaded type, which most often is a 35 mm camera, such as the Leica M5 or as disclosed in German Pat. No. 949,324, a film supply chamber is opened at the bottom of the camera by removing a baseplate from the camera body or by opening a bottom door of the camera. A film cassette or magazine containing a coiled 35 mm filmstrip is inserted longitudinally, i.e., axially, into the opening to the supply chamber. In the back-loaded type, which may be a 110 or 126 size camera or a 35 mm camera, the film supply chamber is opened at the back of the camera by removing a camera back from the camera body or by opening a back door of the camera. A film cartridge containing 110 or 126 size film or a film cassette or magazine (for 35 mm film) is inserted laterally into the opening to the supply chamber.

With both the bottom-loaded camera and the back-loaded camera, typically, before any film is loaded in the camera, either a back door is completely opened or a camera back is removed in order to move a film pressure device, such as a spring-urged plate on the inside of the back door or the camera back, from the camera interior. This is done to provide sufficient space for locating a 110 or 126 size film cartridge across the exposure frame in the camera or for manually threading a 35 mm film leader from the film supply chamber, across the exposure frame, to a film take-up chamber in the camera. When, however the camera is opened to such an extent for film loading, its interior is no longer shielded or protected. This allows dust and other foreign particles to enter the camera interior, which can damage or hinder operation of the interior mechanisms and can interfere with imaging or exposure of the film. Moreover, opening such cameras for film loading allows the user to touch the interior parts and possibly damage them.

In the bottom-loaded camera, film loading requires that the baseplate be removed or the bottom door be opened and that the back door be opened. Such separate operation of two covering members is troublesome and necessitates a certain degree of manual dexterity.

SUMMARY OF THE INVENTION

The above-described problems associated with known cameras are believed solved by the present invention. Specifically, the present invention provides an improved camera door and body construction that allows only limited access to the camera interior during film loading in order to shield interior mechanisms from foreign particles and tampering. On the other hand, the improved door and body construction allows greater or unlimited access to the camera interior should it become necessary, for example, to clear a film jam in the camera or to repair or clean an interior mechanism.

In keeping with the teachings of the present invention, there is disclosed in a bottom-loaded photographic camera, apparatus for providing various degrees of access to the camera interior for film loading and other purposes, the apparatus comprising:

door means, openable to a partially opened position for substantially shielding the camera interior but allowing limited access to the camera interior at the camera bottom for film loading, and openable to a fully opened position for allowing greater access to the camera interior for other purposes; and means for blocking the door means to prevent its opening farther than the partially opened position, the blocking means being adapted to be disabled to permit opening of the door means to its fully opened position.

According to a preferred embodiment of the present invention, the photographic camera has a bottom opening to the camera interior which is shaped for film loading, and the door means is a single door which, in its partially opened position, allows access to the camera interior only through the bottom opening. This arrangement, in effect, substantially shields the camera interior from, for example, foreign particles and fingerprints, during film loading, and simplifies the loading operation. Film pressure means is mounted on the door to hold the film substantially flat during exposure and moves with the door, as the latter is moved to its partially opened position, to provide space for locating film in the camera. Moreover, the means for blocking the door from being opened farther than its partially opened position includes a manually operated latch, urged to engage the door in its partially opened position. The latch is obscured or covered by the door, in a closed position, to prevent the latch from being moved. However, once the door is opened to its partially opened position, the latch is uncovered to permit retraction of the latch from the door, in order to open the door to its fully opened position.

DESCRIPTION OF THE PREFERRED EMBODIMENT

The present invention is described as being embodied in a relatively simple 35 mm camera. Because such cameras are well known, this description is directed in particular to elements forming part of or cooperating directly with the preferred embodiment. It is to be understood, however, that other elements not shown or described may take various forms known or obvious to one having ordinary skill in the design of cameras.

Figure 1:
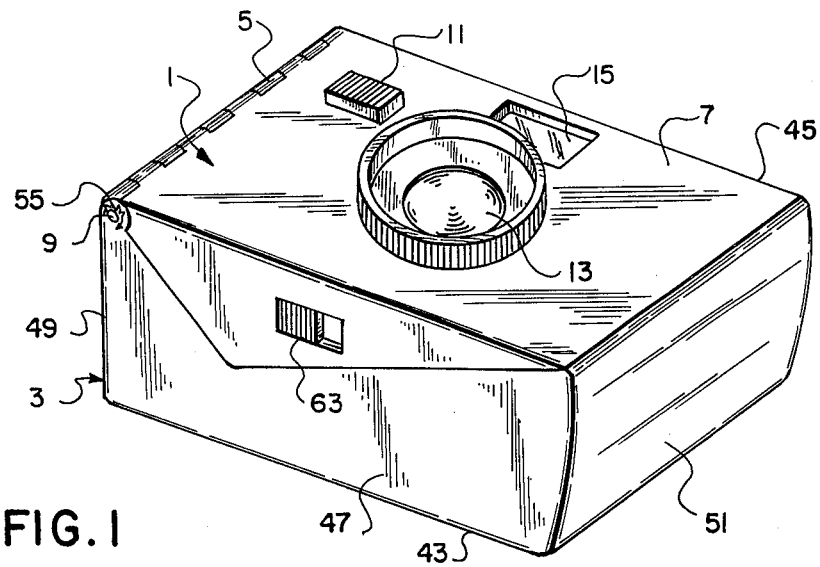
FIG. 1 is a perspective view of a photographic camera having a door and body construction in accordance with a preferred embodiment of the invention.
Figure 2:
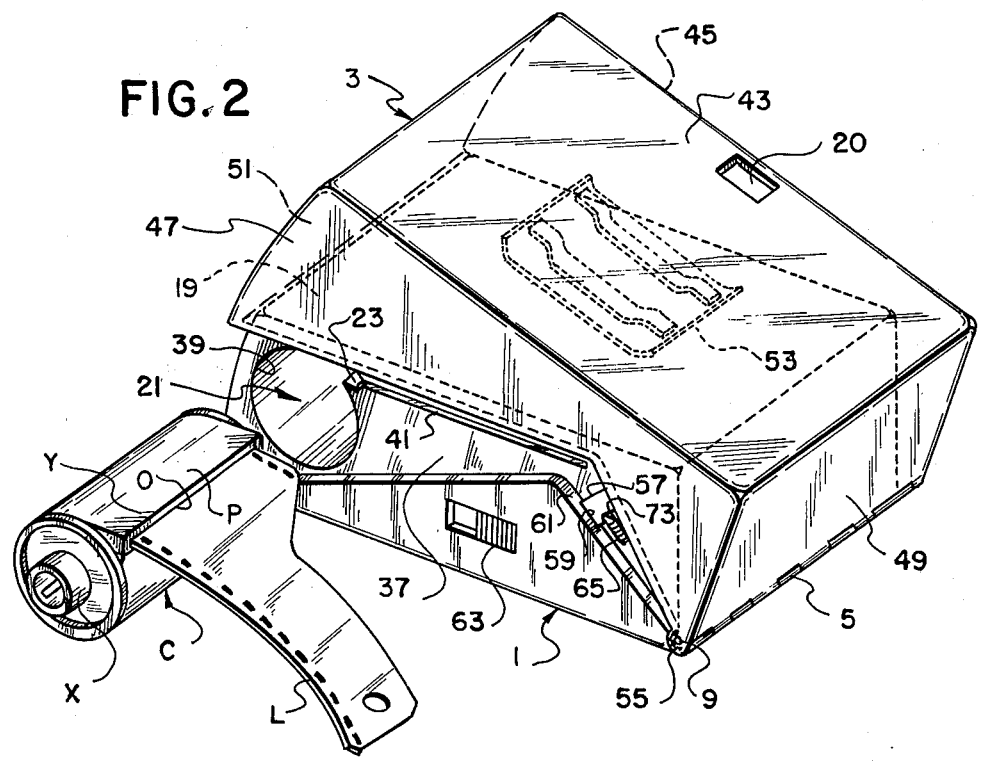
FIG. 2 is a perspective view of the photographic camera, showing the camera door opened to a partially opened position substantially shielding the camera interior but uncovering the camera body for film loading.

Referring now to the drawings, and in particular to FIGS. 1 and 2, there is shown a bottom-loaded 35 mm camera for receiving a film container C, such as a conventional 35 mm film magazine or film cassette. A core member X, rotatably mounted in the film container C, supports a coiled 35 mm filmstrip having a normally curled leader L. The film leader L longitudinally extends out of a light-tight opening O in a lipped portion Y of the film container C.

The camera, in accordance with the invention, preferably comprises a body portion 1 and a unitary cover door 3, although other embodiments, such as a compound or multi-element cover door, may be used. An example of a compound door is disclosed in commonly assigned copending application Ser. No. 260,876, entitled CAMERA DOOR APPARATUS, and filed on May 6, 1981, in the name of Neil G. Seely. A hinge mechanism 5, located adjacent a front wall 7 of the camera body 1, shown in FIG. 1, supports the cover door 3 for pivotal opening and closing movement about a pivot axis concentric with a pin member 9 of the hinge mechanism. On the front wall 7 of the camera body 1, there is illustrated in FIG. 1, a depressable shutter release button 11, a picture-taking lens 13, which may be fixed or variable focus, and a front viewfinder window 15. A rear viewfinder window 17, located on a back portion 19 of the camera body 1 in alignment with the front viewfinder window 15, and a viewing aperture 20, located in the camera door 3 for looking through the viewfinder windows, are illustrated in FIG. 3.

Figure 3:
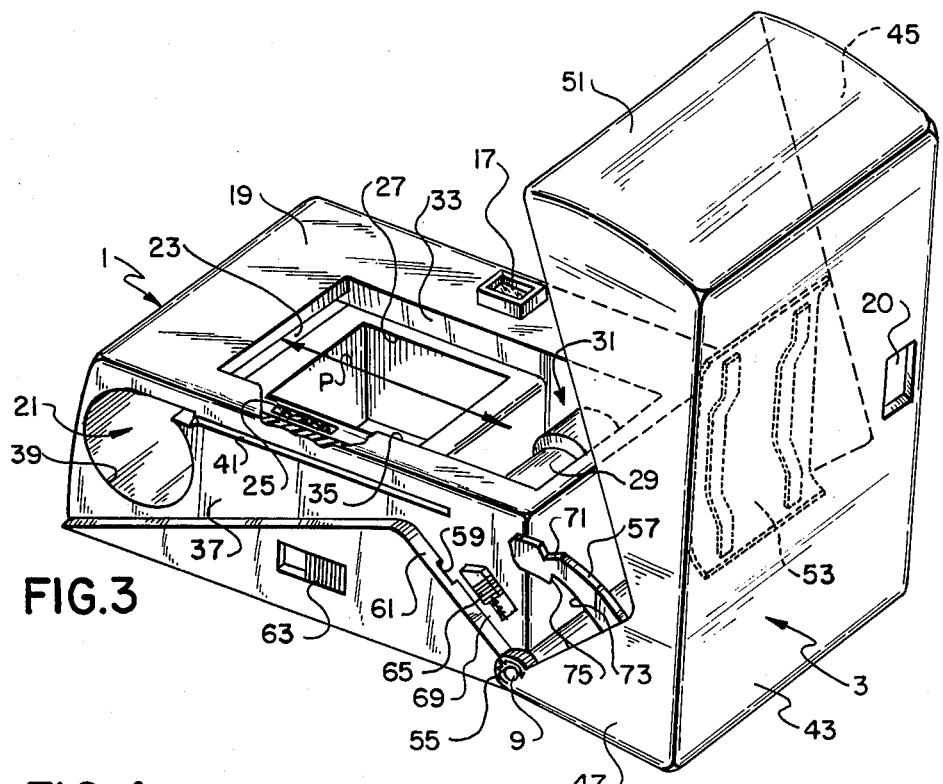
FIG. 3 is a perspective view of the photographic camera, showing the camera door opened to a fully opened position completely uncovering the camera body to allow access to the camera interior.

The camera body 1, as shown in FIG. 3, is open at the back portion 19 to provide access to the camera interior for a number of conventional purposes, such as clearing a film jam, and cleaning or repairing an interior mechanism. A loading or supply chamber 21 in the camera body 1 is shaped to receive and hold the film container C. Known means, not shown, in the loading chamber 21, rotatably supports the core member X of the film container C during film advance and film rewind in the camera. A slot-like extension 23 of the loading chamber 21 holds the lipped portion Y of the film container C to prevent rotation of the film container as the filmstrip is moved. Film advance and film rewind may be accomplished using commonplace drive mechanisms and, in this connection, there is illustrated in FIG. 3, a sprocket wheel 25 for engaging and advancing the filmstrip. As is customary, film advance is from the slot-like extension 23 of the loading chamber 21, across an exposure frame 27, and onto a take-up spool 29, rotatably mounted within a take-up chamber 31 in the camera body 1. Two parallel walls 33 and 35 or other suitable means, such as guide rails or guide rollers, not shown, define a film passageway or a film path, indicated by a double-headed arrow P in FIG. 3, for guiding film between the slot-like extension 23 and the take-up chamber 31.

The loading chamber 21, as shown in FIG. 3, is only accessible for container-loading at a bottom portion 37 of the camera body 1, through an entrance opening 39 to the loading chamber. The film passageway P is accessible for leader-loading at the bottom portion 37 of the camera body 1, through an elongate opening 41 to the film passageway in the wall 35. The entrance opening 39 and the elongate opening 41, together, define a single continuous opening in the bottom portion 37 for inserting the film container C endwise, i.e., axially, into the loading chamber 21 and for inserting the film leader L edgewise, i.e., longitudinal edge first, into the film passageway P. To load the film container C and the film leader L into the camera, the film leader should be slightly shorter in length than that of the elongate opening 41, as shown in FIG. 2. This may be accomplished either by drawing out or winding in an appropriate length of the film leader L, through the light-tight opening O in the film container C. Then, the film leader L, which is normally curled, is held straight and inserted edgewise through the elongate opening 41 and, at the same time, the film container C, is inserted endwise through the entrance opening 39. Means may be provided, such as disclosed in copending commonly assigned application Ser. No. 260,875, entitled FILM LOADING APPARATUS, and filed on May 6, 1981, in the name of Neil G. Seely and David G. Smart, for automatically uncurling the film leader L for movement into the elongate opening 41 as the film container C is moved into the entrance opening 39. Following loading of the film container C and the film leader L into the camera and, preferably, after the cover door 3 is closed, as in FIG. 1, a suitable mechanism, not shown, couples the film leader to the sprocket wheel 25 and initiates film advance to thread the film leader onto the take-up spool 29.

The cover door 3, in accordance with the invention, comprises a back cover element 43, a top cover element 45, a bottom cover element 47, identical in shape to the top cover element, and two similar side cover elements 49 and 51. With the illustrated arrangement of respective cover elements, the cover door 3 in a partially opened position, as shown in FIG. 2, substantially shields the camera interior by enclosing the back portion 19 of the camera body 1. However, limited access is allowed to the camera interior for film loading, through the continuous bottom opening defined by the connected openings 39 and 41 to the loading chamber 21 and the film passageway P. Conversely, the cover door 3 in a fully opened position, as shown in FIG. 3, allows much greater or direct access to the camera interior by uncovering the back portion 19 of the camera body 1. Accordingly, on the one hand, the cover door 3 in the partially opened position substantially shields the camera interior during film loading from foreign particles, fingerprints, and tampering with an interior mechanism. And on the other hand, the cover door in the fully opened position allows access to the camera interior should it become necessary, for example, to clear a film jam in the camera or to repair or clean an interior mechanism.

A spring-urged pressure plate 53, shown in FIGS. 2 and 3, is mounted on the inside of the back cover element 43 of the cover door 3. When the cover door 3 is in a closed position, the pressure plate 53 is located adjacent the film passageway P, to hold a section of filmstrip from the film container C substantially flat and in close proximity to the exposure frame 27 during picture-taking. However, the pressure plate 53 is moved with the cover door 3 to the partially opened position, in FIG. 2, away from the film passageway P, to provide space for inserting the film leader L through the elongate opening 41 to the film passageway.

Figure 4:
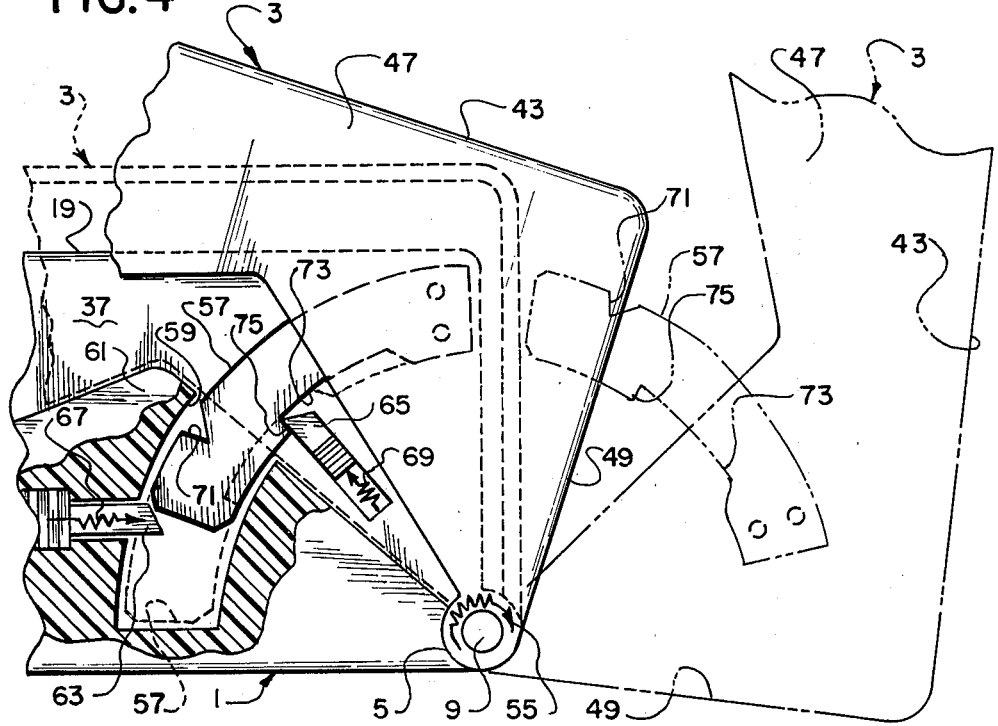
FIG. 4 is an elevation view of the photographic camera, showing a latch mechanism for holding the camera door closed and in its partially opened position.

A releasable latch mechanism is shown in FIGS. 3 and 4 for holding the cover door 3 in the closed and partially opened positions against the opening urging of a spring 55, located adjacent the hinge mechanism 5. The latch mechanism includes an arcuate notched finger 57, fixed to the inside of the bottom cover element 47 of the cover door 3 and receivable in an arcuate channel 59 in a raised piece 61 on the bottom portion 37 of the camera body 1. Two manually slidable locking or latching elements 63 and 65 are located on the raised piece 61 and the bottom portion 37 of the camera body 1 and are urged by respective springs 67 and 69 to engage the notched finger 57 at a V-shaped notch 71 and an elongate notch 73. As shown in FIG. 4, the locking element 63 releasably secures the cover door 3 in the closed position by engaging the arcuate finger 57 at the notch 71, and the locking element 69 blocks the cover door from being opened farther than the partially opened position by engaging the arcuate finger at an edge 75 in the notch 73. Preferably, the locking element 69 is covered by the bottom cover element 47 of the cover door 3 in the closed position, to prevent that locking element from being manually moved. The locking element 69 is uncovered once the cover door 3 is opened to the partially opened position, to permit withdrawal of that locking element from the notch 73 in order to open the cover door to the fully opened position.

The invention has been described in detail with particular reference to a preferred embodiment thereof, but it will be understood that variations and modifications can be effected within the spirit and scope of the invention.

I claim:

1. In a bottom-loaded photographic camera for receiving a film container supporting a filmstrip having a leader extending from the container, apparatus for providing various degrees of access to the camera interior for film loading and other purposes, said apparatus comprising:
   door means, openable to a partially opened position for substantially shielding the camera interior but allowing limited access to the camera interior at the camera bottom for loading a film container into said camera, and openable to a fully opened position for allowing greater access to the camera interior for other purposes; and
   means for blocking said door means to prevent its opening farther than the partially opened position, said blocking means being adapted to be disabled to permit opening of said door means to its fully opened position.

2. Apparatus as recited in claim 1, wherein said photographic camera has an opening to the camera interior at the camera bottom for receiving a film container, and said door means in its partially opened position allows access to the camera interior only through said opening.

3. Apparatus as recited in claim 2, wherein said door means is a single door having integral first and second covers which in the partially opened position substantially shield the camera interior and uncover said opening to the camera interior, respectively.

4. Apparatus as recited in claim 1, wherein said blocking means is adapted to release said door means only in the partially opened position.

5. In a bottom-loaded photographic camera for receiving a film container supporting a filmstrip having a leader extending from the container, apparatus for providing various degrees of access to the camera interior for film loading and other purposes, said apparatus comprising:
   normally closed door means, effective in a partially opened position for substantially shielding the camera interior but allowing limited access to the camera interior at the camera bottom for loading a film container into said camera, and effective in a fully opened position for allowing greater access to the camera interior for other purposes;
   means supporting said door means for opening movement from a closed position to its partially and fully opened position; and
   latching means for holding said door means to prevent its opening farther than the partially opened position, said latching means being manually movable to release said door means in its partially opened position for opening to its fully opened position and being obscured by said door means in its closed position to prevent manual movement of said latching means.

6. In a photographic camera for receiving a film container supporting a filmstrip having a leader extending from the container, apparatus for providing various degrees of access to the camera interior for film loading and other purposes, said apparatus comprising:
   door means, openable to a partially opened position for substantially shielding the camera interior but allowing limited access to the camera interior for loading a film container into said camera, and openable to a fully opened position for allowing greater access to the camera interior for other purposes;
   film pressure means, mounted on said door means in the camera interior, for holding a filmstrip substantially flat during exposure and for movement with said door means to its partially opened position to provide space for locating a film leader in said camera; and
   means for blocking said door means to prevent its opening farther than the partially opened position and for releasing said door means in its partially opened position for opening to its fully opened position.

7. In a bottom-loaded photographic camera for receiving a film container supporting a filmstrip having a leader extending from the container, apparatus for providing various degrees of access to the camera interior for film loading and other purposes, said apparatus comprising:
   means defining (a) a loading chamber in the camera interior for a film container, and (b) an opening to said chamber at the camera bottom for receiving the film container;
   means defining (a) a film passageway in the camera interior for guiding a filmstrip from a film container received in said loading chamber, and (b) an elongate opening to said passageway along the camera bottom for receiving a film leader as a film container is received in said opening to said loading chamber;
   door means, openable to a partially opened position for substantially shielding the camera interior but allowing limited access to the camera interior through said openings to said loading chamber and said passageway, and openable to a fully opened position for allowing greater access to the camera interior; and
   means for blocking said door means to prevent its opening farther than the partially opened position and for releasing said door means in its partially opened position for opening to its fully opened position.

8. Apparatus as recited in claim 7, wherein said door means includes (a) a back cover which substantially shields the camera interior when said door means is in its partially opened position, (b) a bottom cover which is joined with said back cover and uncovers said openings to said loading chamber and said passageway when said door means is in its partially opened position, and (c) means supporting both of said covers for pivoting on the same axis.

9. Apparatus as recited in claim 8, wherein a film platen is located on said back cover adjacent said film passageway to hold a filmstrip substantially flat during exposure and is moved away from said passageway as said door means is opened to its partially opened position to provide space for inserting a film leader into said passageway.

* * * * *